United States Patent [19]
Eisbrenner et al.

[11] Patent Number: 5,251,502
[45] Date of Patent: Oct. 12, 1993

[54] SEQUENTIAL PIVOT PIN MULTIPLIER

[75] Inventors: Ronald J. Eisbrenner, Shelby Township, Maccomb County; Edward E. Sunderman; Donald B. DeCorte, both of Mt. Clemens, all of Mich.

[73] Assignee: Savair Inc., St. Clair, Mich.

[21] Appl. No.: 895,784

[22] Filed: Jun. 9, 1992

[51] Int. Cl.⁵ .................... F16H 21/10; B21J 9/18
[52] U.S. Cl. .......................... 74/110; 72/450; 72/452; 74/516; 74/522
[58] Field of Search ............ 74/110, 522, 516, 559; 72/450, 452

[56] References Cited

U.S. PATENT DOCUMENTS

| | | | |
|---|---|---|---|
| 3,453,914 | 7/1969 | Lemper et al. | 83/8 |
| 3,482,830 | 12/1969 | Sendoykas | 269/32 |
| 3,680,400 | 8/1972 | Lemper et al. | 74/89.15 |
| 3,926,033 | 12/1975 | Forichon | 72/451 |
| 4,429,589 | 2/1984 | Stocker | 74/516 X |
| 4,932,128 | 6/1990 | Dacey, Jr. | 30/362 |

FOREIGN PATENT DOCUMENTS 2416110 10/1975 Fed. Rep. of Germany ........ 74/516

Primary Examiner—Allan D. Herrmann
Attorney, Agent, or Firm—Remy J. Van Ophem

[57] ABSTRACT

A mechanical force enhancement device which both amplified an input force to produce a larger output force while also reducing the speed of an output member during the latter part of the output stroke. The device employs a sequential pivoting operation which is capable of providing the above results while being uncomplicated in its design and construction. The device includes a housing having a pair of spaced-apart camming plates. Each camming plate has a pair of opposing camming contours formed therein so as to define two sets of spaced-apart camming contours. At one end of each camming contour is a recess so as to define two sets of spaced-apart recesses. A linkage member is disposed between the camming plates and includes a driven end adjacent one of the sets of spaced-apart camming contours and a driving end adjacent the other set of spaced-apart camming contours. The linkage member also includes a pair of camming members, each of which engages a corresponding one of the sets of spaced-apart camming contours. The camming members are able to engage their respective recesses only when the other camming member is engaged with its respective camming contours. A stroking device is engaged with the driven end of the linkage member and a rod is engaged with the driving end to reciprocate relative to the housing. A tool can be attached to the distal end of the rod to perform work on a workpiece.

19 Claims, 3 Drawing Sheets

SEQUENTIAL PIVOT PIN MULTIPLIER

BACKGROUND OF THE INVENTION

1. Field of the Invention

The present invention generally relates to a mechanical device for the enhancement of a linear force, such as a device used to actuate the punch of a punch and die set. More specifically, this invention relates to a mechanical force enhancer having a link which is sequentially cammed about two fulcrums by which a force delivery member is sequentially operated between a relatively low force stroke and a slower, relatively high force stroke.

2. Description of the Prior Art

The prior art discloses a wide variety of mechanical devices which operate to mechanically amplify a force which is delivered by hand or by a mechanical device such as a fluid cylinder. Generally, such a mechanical force enhancer receives as an input a relatively small linear or rotary force and amplifies or multiplies it to produce a larger linear force. For manufacturing applications, such as a mechanical force enhancer employed to operate a punch and die set, the input force is most often generated by a fluid driven cylinder or an electric or fluid-driven motor to permit some degree of automation.

An taught in U.S. Pat. Nos. 3,453,914 and 3,680,400 to Lemper et al., an input force can be multiplied to produce a larger output force by employing an eccentric which is rotated against a ram member carrying a tool used to perform work on a workpiece. The force enhancers taught by Lemper et al. employ an independently-powered screw mechanism which cooperates with the eccentric to incrementally advance the ram member such that the output of each device is characterized by an incremental movement toward the workpiece coupled with a variable output force at the ram member. A disadvantage with the devices taught by Lemper et al. is that they are rather complicated in their construction and rely upon two separate inputs to produce the force amplification sought. In contrast, U.S. Pat. No. 2,390,371 to Ivy teaches a simpler force amplification device which employs an eccentric that operates a pair of levers to deliver a large linear output force for a punching process. However, the mechanical advantage of the eccentric taught by Ivy is rather minor in terms of force amplification.

Mechanical force enhancers are often used to operate a tool which performs work on a workpiece, such as a punch and die set noted above. With such applications, it is typically preferable that the tool be slowed near the end of its stroke to prevent unnecessary impacting of the workpiece. An example of such a device is taught in U.S. Pat. No. 4,932,128 to Dacey, Jr. Dacey, Jr. teaches a pneumatic cylinder which is mounted to a housing having a pair of spaced-apart side plates. The cylinder's piston rod is attached to a first end of a link which is guided by one of a pair of complementary grooves in the side plates. The second end of the link is guided by the second of the pair of complementary grooves, and a ram is attached to the link intermediate the first and second ends of the link. After the link has been translated a prescribed distance, the second end of the link is stopped, forcing the link to pivot about the second end. As a result, after the second end of the link is stopped, the speed of the ram is decreased and the force input of the cylinder is amplified to the ram by the effect of the link rotating about its second end. However, a drawback to the force enhancer taught by Dacey, Jr. is that the device is rather complicated, the ultimate force output is limited by the relatively small size of the link, and the particular structure necessitated by the pivot feature of the link is rather complicated, requiring an added level of precision.

As taught in U.S. Pat. No. 3,482,830 to Sendoykas, camming mechanisms are also known in the prior art as being useful to alter the output speed of a device whose output is in the form of a force. Sendoykas teaches a cylinder whose linear input is operated on through a camming device and two separate pivots to alter the speed of a clamp. The pivots serve as sequential fulcrums about which the body of the clamp pivots as the cylinder extends and retracts. However, the output force is not intentionally amplified by the device in that the moment created by the cylinder about each fulcrum is roughly the same.

From the above discussion, it can be readily appreciated that the prior art does not disclose a mechanical force enhancer which is capable of producing an amplified output to a work-performing ram while also being uncomplicated in its construction and operation. Nor does the prior art disclose such a device which is particularly suitable for use as a punch and die press, wherein the output speed of the ram is reduced near the end of the stroke to prevent excessive impact loads on a workpiece.

Accordingly, what is needed is a cost-efficient mechanical force enhancing device suitable for use as a punch and die press, the mechanical force enhancement device being capable of amplifying an input force and delivering the amplified force to a ram member which includes a work-performing tool, wherein the force amplification is derived from operating the device off two stationary fulcrums which are rugged and uncomplicated in their design and which also serve to reduce the output speed as the tool nears the workpiece.

SUMMARY OF THE INVENTION

According to the present invention there is provided a mechanical force enhancement device which both amplifies an input force to produce a larger output force acting upon an output member, while also reducing the speed of the output member during the latter part of the output stroke. The mechanical force enhancement device is capable of providing the above results while also being uncomplicated in its design and construction in that both the force amplification and the speed reduction are provided through sequentially pivoting a linkage upon a pair of fulcrums built into a housing which supports both an input device and an output device.

As a result, the mechanical force enhancement device of the present invention is particularly well suited for use with a tool that performs work on a workpiece, such as a piercing and clinching device used to actuate a punch against a die. With reference to its use with a punch and die set, the mechanical force enhancement device essentially relies upon a sequential pivot pin multiplier to provide an initial low-force extend stroke to the punch, and then later, as the punch draws near to the die, a slower, high-force extend stroke. The sequential pivot pin multiplier achieves this function by using a linkage member which uses two separate fulcrum points to effect the speed and force of the punch relative to the die. Though described throughout in terms of its use with a punch and die set, it will be apparent that the mechanical force enhancement device of the present invention is suitable for a wide variety of other applications which rely upon an output force to perform work, whether there is a need for only the speed reduction feature, or only the force amplification feature, or both.

The mechanical force enhancement device of the present invention includes a housing having at least one camming plate, and more preferably two spaced-apart camming plates. Each camming plate has a pair of camming contours formed therein so as to define two sets of spaced-apart camming contours. At one end of each camming contour there is a fulcrum so as to define two sets of spaced-apart fulcrums. The linkage member noted above is disposed between the camming plates. The linkage member has a driven end between one of the sets of spaced-apart camming contours, and a driving end between the second set of spaced-apart camming contours. In addition, the linkage member includes a pair of camming members which are attached to the linkage member such that a first camming member of the pair of camming members is engagable with the first set of spaced-apart camming contours and the second camming member is engagable with the second set of spaced-apart camming contours. In particular, the camming members can engage their respective sets of spaced-apart fulcrums only when the other camming member is engaged with its respective set of spaced-apart camming contours.

The mechanical force enhancer also includes a stroking device engaged with the driven end of the linkage member for stroking the first camming member along the first set of spaced-apart camming contours. An output member, such as a rod, is engaged with the driving end to reciprocate relative to the housing. A tool, such as a punch, can then be attached to the distal end of the rod for performing work on a workpiece.

In operation, the stroking member strokes the driven end of the linkage member while the first camming member is engaged with the first set of spaced-apart fulcrums and the second camming member cams the second set of spaced-apart camming contours. The output at the driven end of the linkage member, and thus at the tool, is characterized as having an output speed at some proportion relative to the rate at which the stroking device is actuated. Simultaneously, the ratio between the input force of the stroking device and the output force at the tool is inverse to the speed ratio. The second camming member continues to cam against the second set of spaced-apart camming contours until the second camming member encounters and engages the second set of spaced-apart fulcrums. At that time, the first camming member disengages the first set of spaced-apart fulcrums and cams the first set of spaced-apart camming contours. In that the linkage member is now being pivoted about the second set of spaced-apart fulcrums which is most remote from the input, or driven end, of the linkage member, the output at the driven end of the linkage member, and thus at the tool, is characterized as having a proportionately lower output speed relative to the rate at which the stroking device is actuated. However, since the ratio between the input force of the stroking device and the output force at the tool is inverse to the speed proportion, the output force of the rod is proportionately higher than the previous force level.

According to a preferred aspect of this invention, the force enhancement is achieved by the sequential use of two fulcrums which alter the mechanical advantage across a linkage member between an input end and an output end. As such, the mechanical operation of the device is uncomplicated and, as a direct result, highly efficient. The camming members which engage the fulcrums are guided to and from the fulcrums by a pair of camming contours which ensure smooth and continuous operation of the device. The movement of the linkage member can be regulated by added external adjustment which limits how far the linkage member can rotate about either or both fulcrums. Moreover, the mechanical advantage of the device can be readily altered by relocating the fulcrums and relocating the camming members on the linkage member.

In addition, the mechanical force enhancement device of the present invention permits the tool to have a large amount of stroke or linear movement, enabling it to adapt to workpieces of various thicknesses, while also delivering a load of high magnitude at a low rate of application during the latter part of the stroke.

Another significant advantage of the present invention is that the fulcrums are formed as integral portions of the camming contours to minimize the number of components necessary to perform both the guiding and pivoting operations upon the linkage member. Mechanical contact is maintained between the camming members and the camming contours such that the output of the device is controlled and exhibits a smooth transition between the low and high force portions of the output stroke. In addition, with this construction and arrangement, the linkage member is the only component necessary to transmit the load between the input device and the output device such that no additional hardware is necessary to perform the force enhancement operation of the present invention. Consequently, the device is extremely compact and light compared to force enhancement devices with similar load capabilities.

Accordingly, it is an object of the present invention to provide a force enhancement device for amplifying an input force and delivering the amplified force to a work-performing output member.

It is a further object of the invention that the force enhancement device be compact and uncomplicated in its construction so as to be versatile for use in a typical work environment.

It is still a further object of the invention that the force enhancement device include a linkage member which sequentially rotates about a pair of fulcrums such that the output member travels a relatively large distance under the influence of a relatively small force, and then travels a much shorter distance under a greatly increased force.

It is another object of the invention that the fulcrums be provided an as integral part of a pair of camming contours mounted to a housing within which the linkage member is housed.

It is yet another object of the invention that the force enhancement device be suitable as a piercing or punching device for operating a punching or piercing member.

It is still another object of the invention that the force enhancement device be constructed so as to be readily adapted to provide different output loads and travels for a given input.

Other objects and advantages of this invention will be more apparent after a reading of the following detailed description taken in conjunction with the drawings provided.

DETAILED DESCRIPTION OF THE PREFERRED EMBODIMENT

Figure 1:
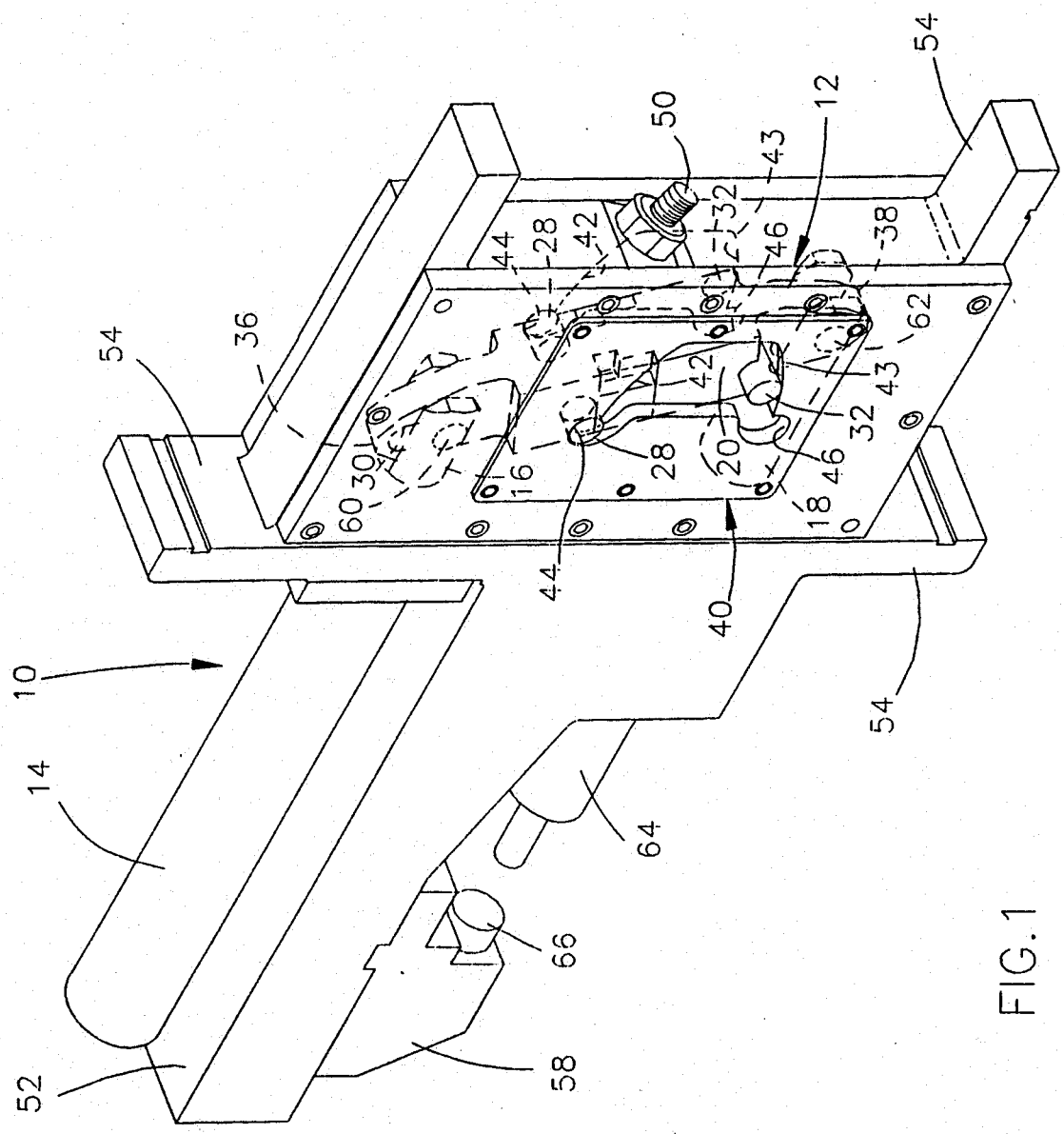
FIG. 1 is a perspective view of a mechanical force enhancement device shown in the form of a punch and die combination in accordance with a preferred embodiment of this invention.

With reference to FIG. 1, there is shown a perspective view of a mechanical force enhancement device 10 which employs a sequential pivot pin multiplier in accordance with a preferred embodiment of the present invention. As illustrated, the mechanical force enhancement device 10 is adapted for use as a piercing and clinching device used to actuate a punch 64 against a die 66. The following description will specifically refer to the use of the present invention within the environment of the illustrated piercing and clinching device for purposes of clarity so as to assist in the understanding of the disclosure. However, the teachings of the present invention are not limited to a piercing and clinching device, and can be readily adapted by one skilled in the art to a wide variety of other operations which rely upon an output force to perform work, whether the operation requires only a speed reduction feature, a force amplification feature, or both.

Figure 2:
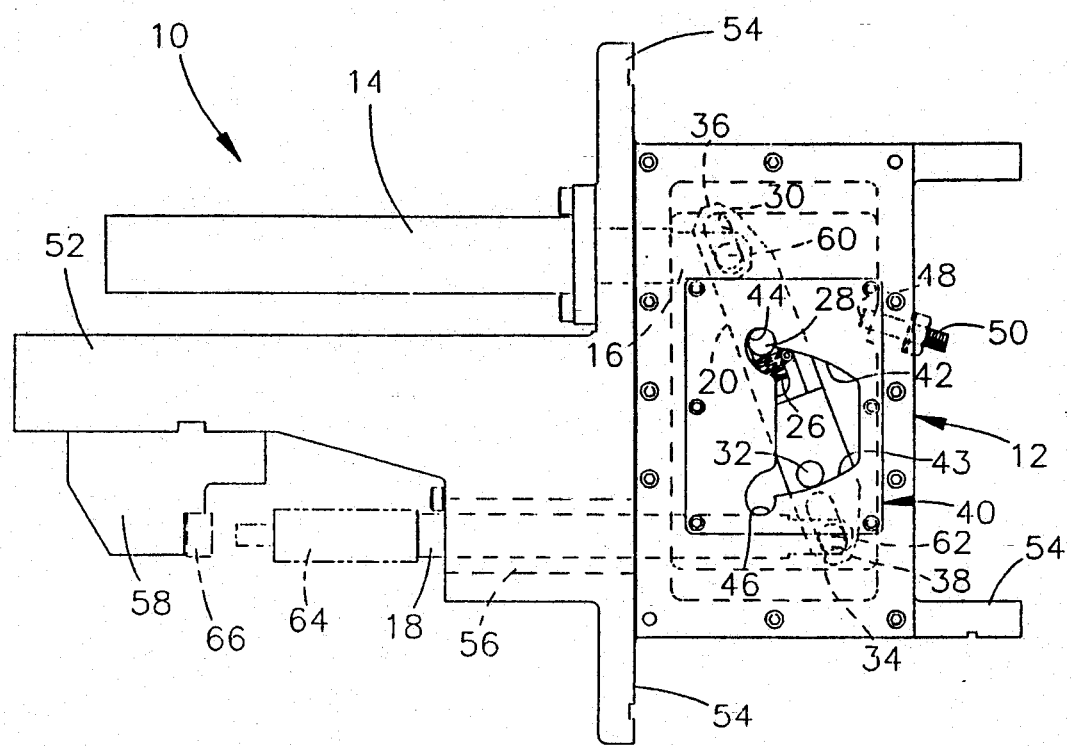
FIG. 2 is a side view in partial cross section of the device of FIG. 1 wherein a work-performing tool is retracted in accordance with a preferred embodiment of this invention.
Figure 3:
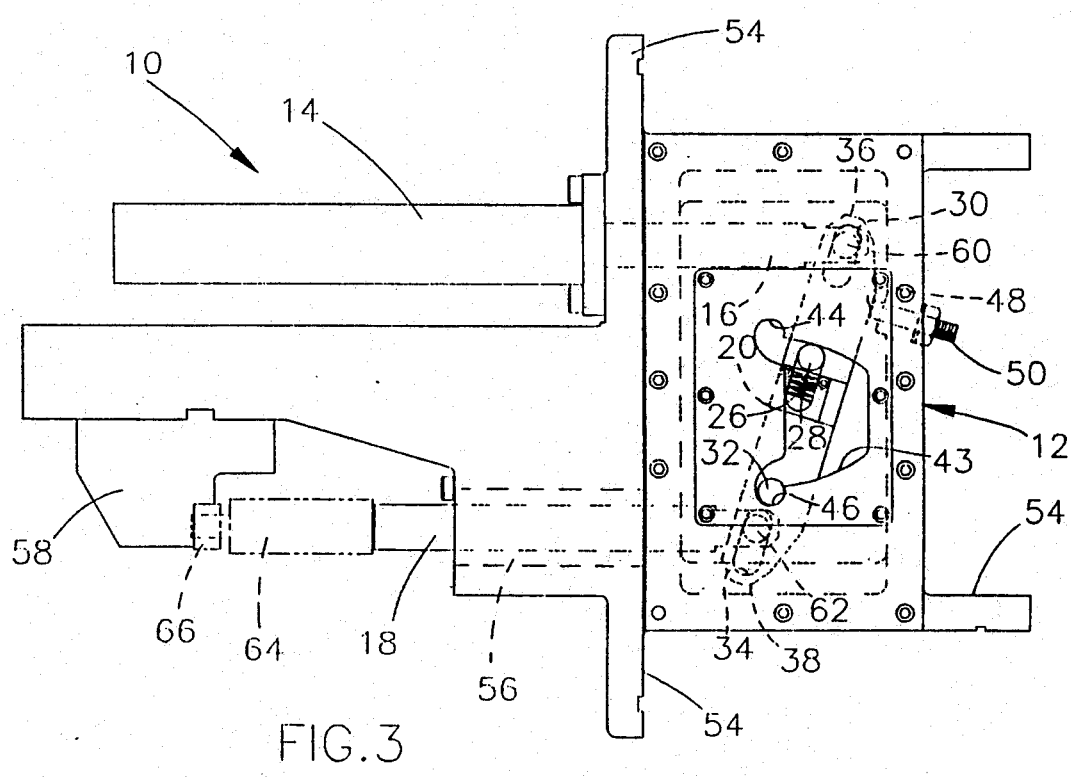
FIG. 3 is a side view in partial cross section of the device of FIG. 1 wherein the work-performing tool is extended in accordance with the preferred embodiment of this invention.

The mechanical force enhancement device 10 includes a housing 12 having a number of mounting flanges 54 by which the mechanical force enhancement device 10 can be mounted to a suitable support structure (not shown). A fluid driven cylinder assembly 14 is mounted to the housing 12. The cylinder assembly 14 includes a cylinder rod 16 which is reciprocated by a piston (not shown) reciprocably mounted within the cylinder assembly 14. The cylinder rod 16 extends into the housing 12 to operate upon the internal components of the housing 12 in a manner which will be fully explained below. Below the cylinder assembly 14 there is a beam 52 which is mounted to the housing 12. A die support beam 58 is mounted and projects downwardly from the beam 52. The die support beam 58 is suitably provided with a recess (not shown) in which the die 66 is received. Longitudinally aligned with the die 66 is the punch 64 which is mounted to a rod 18. The rod 18 extends from the housing 12 in a manner essentially parallel to the cylinder assembly 14. As seen in FIGS. 2 and 3, the rod 18 is supported in the housing 12 with a journal bearing 56. Preferably, the journal bearing 56 is formed from a suitably rigid material such as aluminum and coated with a low friction-wear resistant material, such as a suitable grade of Teflon TM which is well known in the art.

Essentially, the mechanical force enhancement device 10 of the present invention relies upon a sequential pivot pin multiplier to provide an initial low-force extend stroke to the punch 64, and then later, as the punch 64 draws near to the die 66, a slower but higher-force extend stroke. The sequential pivot pin multiplier achieves this action by employing a pivot link 20 which has two spaced-apart camming pins 28 and 32 which sequentially engage a corresponding pair of fulcrum points to determine the speed and force of the punch 64 relative to the die 66. As best seen in FIGS. 2 and 3, the pivot link 20 is elongate and has a pair of oppositely disposed ends. As viewed in FIGS. 2 and 3, the upper end is designated the driven end 36 in that it is driven by the cylinder rod 16, while the lower end is designated the driving end 38 in that it drives the rod 18.

Both the driven end 36 and the driving ends 38 have an elongate slot 30 and 34, respectively. The driven end slot 30 is coupled to the cylinder rod 16 with a cylinder rod pin 60, while the driving end slot 34 is coupled to the rod 18 with a rod pin 62. Preferably, the ends of both the cylinder rod 16 and the rod 18 are formed to be yokes (not shown) within which the driven and driving ends 36 and 38, respectively, are received. The yoke and slot combination permits relative movement between the cylinder rod 16 and the pivot link 20 and the rod 18 and the pivot link 20 for purposes which will become apparent with the further discussion below. Due to the sliding action between the driven end and driving end slots 30 and 34 and the cylinder pin 60 and rod pin 62, respectively, it is preferable that each is hardened to resist wear.

With continued reference to FIGS. 2 and 3, the camming pins 28 and 32, designated the driven end and driving end camming pins 28 and 32, respectively, are each guided within a corresponding driven end and driving end cam track 42 and 43. Preferably, the camming pins 28 and 32 are free to rotate so as to reduce friction between them and their respective cam tracks 42 and 43. The cam tracks 42 and 43 are formed in a side plate 40 mounted to the side of the housing 12. In the preferred embodiment, the housing 12 has a pair of spaced-apart side plates 40 mounted on opposite sides of the housing 12, as can be seen in FIG. 1. In addition, each side plate 40 is provided with its own pair of cam tracks 42 and 43. With this preferred construction, each camming pin 28 and 32 extends through the pivot link 20, and each of its ends engages one of its corresponding cam tracks 42 or 43. The obvious benefit to this symmetrical arrangement is that no cantilevered loading of the camming pins 28 and 32 and of the pivot link 20 occurs, resulting in a more efficient operation and better wear characteristics. However, for the sake of clarity the remaining detailed description will describe the operation of the mechanical force enhancement device 10 with reference only to one side plate 40 and its corresponding cam tracks 42 and 43.

Figure 5:
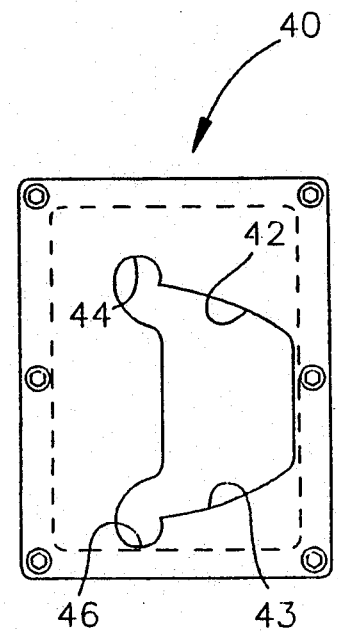
FIG. 5 is a detailed view of a side plate which contains an integral pair of cam tracks and recesses in accordance with the preferred embodiment of this invention.

In the preferred embodiment shown in FIG. 5, the driven end driving end cam tracks 42 and 43 are integrally formed as a U-shaped contour, with the legs of the U-shaped contour serving as the camming portions which the camming pins 28 and 32 cam against. A pair of recesses 44 and 46 are formed in the end of each leg of the U-shaped contour such that the recesses 44 and 46 constitute integral parts of the driven and driving end cam tracks 42 and 43, respectively. The recesses 44 and 46 project in opposite directions from each other as shown such that they serve as a detent in their respective cam tracks 42 and 43.

Figure 4:
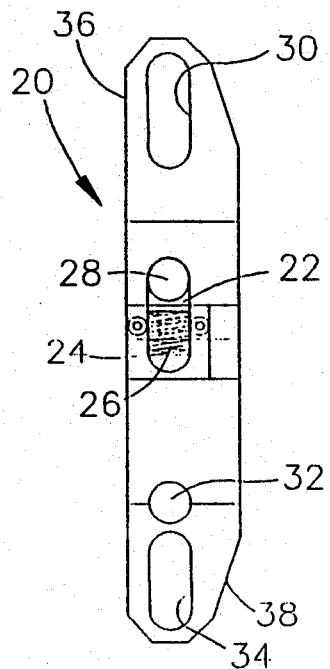
FIG. 4 is a detailed view of a pivot link in accordance with the preferred embodiment of this invention.

The arc of each cam track 42 and 43 is taken from the center of the opposing recess 44 and 46 and is approximately the distance between the camming pins 28 and 32 such that, as illustrated in FIG. 3, the driving end camming pin 32 can cam against its corresponding cam track 43 only when the driven end camming pin 28 is engaged with its corresponding recess 44. Likewise, the driven end camming pin 28 can cam against its corresponding cam track 42 only when the driving end camming pin 32 is engaged with its corresponding recess 46, as illustrated in FIG. 4. It is important to note that the distance between the camming pins 28 and 32, in conjunction with their locations relative to the driven and driving ends 36 and 38 of the pivot link 20, determines the actual mechanical advantage available from the mechanical force enhancement device 10. Accordingly, the spacing of the camming pins 28 and 32, along with the corresponding cam track contours necessary to match the camming pins 28 and 32, is a chief consideration when determining the preferred operating parameters of the mechanical force enhancement device 10.

With reference now to FIG. 4, the pivot link 20 is preferably constructed to provide a fixed position for one of the two camming pins 28 and 32 while biasing the remaining camming pin 28 and 32 to accommodate any detrimental tolerancing effects. As a result, each of the camming pins 28 and 32 remains fully engaged with its respective cam track 42 and 43 throughout the operating range of the pivot link 20. Moreover, when either camming pin 28 or 32 encounters its corresponding recess 44 or 46, the camming pin 28 or 32 is positively urged to engage its recess 44 or 46 such that the other camming pin 28 or 32 is released from its recess 44 and 46. As illustrated in FIG. 4, the driving end camming pin 32 includes a pin locator assembly 22 received in a recess adjacent the driving end camming pin 32. The pin locator assembly 22 includes a compression spring 26 which forcibly biases the driving end camming pin 32 in a longitudinal direction away from the driven end camming pin 28. In practice, a spring preload of approximately 80 pounds has been found to be sufficient to ensure that the camming pins 28 and 32 are properly engaged with their respective cam tracks 42 and 43. The pin locator assembly 22 is protected from the interior environment of the housing 12 by a retaining plate 24.

With reference again to FIGS. 2 and 3, the pivot link 20 is provided with at least one stop 48 which is adjustably mounted to the housing 12. An adjustment screw 50 allows the stop 48 to be easily adjusted, permitting the stop 48 to be positioned to selectively limit the movement of the pivot link 20 at its driven end 36. In effect, the stop 48 also serves to limit the stroke of the rod 18, permitting the mechanical force enhancement device 10 of the present invention to be readily adjusted to perform a punching or piercing operation on workpieces of various thicknesses.

Figure 6:
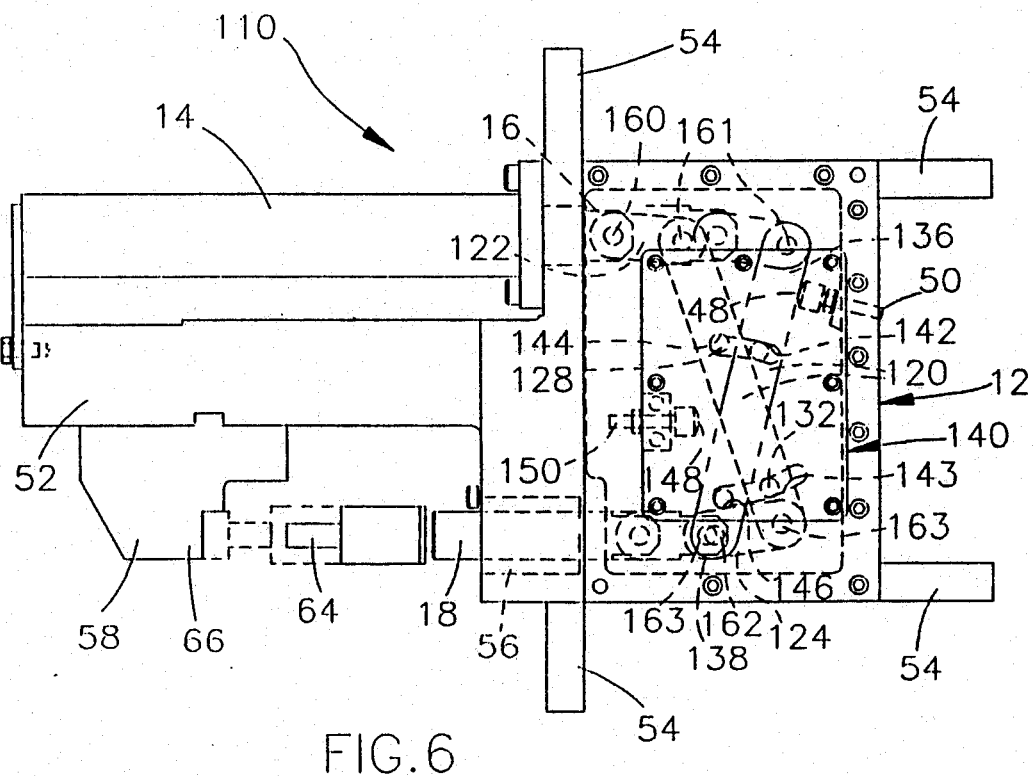
FIG. 6 is a side view of a second embodiment of the invention, wherein a pair of interconnecting links cooperate with the pivot link and the cam tracks are formed to be separate.

In a second embodiment shown in FIG. 6, the construction of a mechanical force enhancement device 110 is nearly identical to the mechanical force enhancement device 10 of the preferred embodiment, a primary distinction being a pair of interconnecting links 122 and 124 which function as substitutes for the pin locator assembly 22 and the driven and driving end slots 30 and 34 of the preferred embodiment. As with the pin locator assembly 22, the interconnecting links 122 and 124 accommodate the dimensional tolerance effects between the pins 28 and 32 and the cam tracks 42 and 43. Moreover, the interconnecting links 122 and 124 allow for a significant degree of misalignment between the cylinder rod 16 and the driven end 136 of the pivot link 120, and between the rod 118 and the driving end 138 of the pivot link 120. The recesses 144 and 146, shown in FIG. 6, are similarly located in the cam tracks 142 and 143, as the recesses 44 and 46 of FIG. 5. However, the recesses 144 and 146 of the second embodiment are not as pronounced as the recesses 44 and 46 of the first embodiment, as depicted in FIG. 5.

The driven end interconnecting link 122 is connected to the cylinder rod 116 and the driven end 136 of the pivot link 120 with a pair of cylinder rod pins 160 and 161, while the driving end interconnecting link 124 is connected to the rod 118 and the driving end 138 of the pivot link 120 with a pair of rod pins 162 and 163. An advantage to this arrangement is that the sliding between the cylinder rod pin 60 and the rod pin 62 and the driven and driving end slots 30 and 34 of the preferred embodiment is eliminated. Accordingly, the potential for wear is also reduced at these particular locations. However, a disadvantage with the structure of the second embodiment shown in FIG. 6 is that a small percentage of mechanical efficiency is lost because the cylinder rod 116 and the rod 118 do not act directly upon the pivot link 120.

Also shown in FIG. 6 is a second stop 148 with a corresponding second adjustment screw 150. The second stop 148 is located adjacent the driving end 138 of the pivot link 120 to directly limit the stroke of the rod 118. In addition, the cam tracks 142 and 143 are shown as being machined entirely separately into the side plate 140. However, the operation associated with the second embodiment remains essentially identical to that of the first.

In the operation of both the first and second embodiments of the present invention, the cylinder assembly 14 is driven by a suitable fluid, such as air at typical shop pressures of about 75 psi. Under the influence of the air, the cylinder rod 16 extends, thereby stroking the driving end camming pin 32 along the driving end cam track 43 while the driven end camming pin 28 is trapped in its recess 44, as seen in FIG. 2. Accordingly, the recess 44 defines a first fulcrum point about which the pivot link 20 rotates during the first part of the stroke. During this time the driving end camming pin 32 is forced to follow its cam track 43 toward its corresponding recess 46. Also during this portion of the stroke, the output at the rod 18 can be characterized as being relatively rapid and low force because the cylinder rod 16 is operating upon a shorter cantilever relative to the first fulcrum (the driven end recess 44), and the output, as embodied in the rod 18, is located on a longer cantilever relative to the first fulcrum.

Once the driving end camming pin 32 encounters its recess 46, it is forced into the recess 46 by the operational forces induced by the cylinder rod 16 and the pin locator assembly 22. Simultaneously, the driven end camming pin 28 drops out of its corresponding recess 44, and thereafter follows its driven end cam track 42, as seen in FIG. 3. As a result, the driving end pin 32 and its recess 46 together define a second fulcrum point about which the pivot link 20 rotates during the latter part of the stroke. During this portion of the stroke, the output at the rod 18 can be characterized as being relatively slow and high force because the cylinder rod 16 is operating upon a longer cantilever relative to the second fulcrum (the driving end recess 46), and the output, as embodied in the rod 18, is located on a shorter cantilever relative to the second fulcrum.

As a result, the operation of the mechanical force enhancement device 10 of the present invention provides a two-stage operation. During the first stage as the punch 64 is being brought into position, the first fulcrum permits the punch 64 to approach the die 66 rapidly. Thereafter, as the punch 64 draws nearer to the die 66, the second stage of operation begins, wherein the pivot link 20 pivots upon the second fulcrum to provide a much slower but greatly increased force. The slower stroke, as the punch 64 meets the die 66, ensures that excessive impact loading will be minimized.

Accordingly, a significant advantage of the mechanical force enhancement device 10 of the present invention is that mechanical force enhancement is achieved by the sequential use of two fulcrums which alter the mechanical advantage across the pivot link 20 between an input end (the cylinder rod 16) and an output end (the rod 18). This structure provides for mechanical operation which is uncomplicated and, as a direct result, highly efficient. The fulcrums are advantageously provided as the recesses 44 and 46 in the pair of cam tracks 42 and 43, such that each camming pin 28 and 32 are guided into and out of engagement with its respective recess 44 and 46. The movement of the pivot link 20 is regulated by the stop 48 which limits how far the pivot link 20 is permitted to rotate about either fulcrum.

In addition, the mechanical force enhancement device 10 of the present invention permits a tool to have a large amount of stroke or linear movement during a first stage of operation, enabling the mechanical force enhancement device 10 to be adapted to workpieces of various thicknesses, while also delivering a load of high magnitude at a low rate of application during the latter part of the stroke. Moreover, the mechanical advantage of the mechanical force enhancement device 10 can be readily altered by replacing the side plates 40 with ones that have the recesses 44 and 46 relocated to define different fulcrum locations. The pivot link 20 can then be replaced with one in which the camming pins 28 and 32 are relocated to correspond with the new locations of the recesses 44 and 46 in the side plates 40.

Another significant advantage of the present invention is that the fulcrums, as recesses 44 and 46, are formed as integral portions of the cam tracks 42 and 43 in a manner that minimizes the number of components necessary to guide and pivot the pivot link 20 in the preferred manner described above. Mechanical contact is maintained between the camming pins 28 and 32 and the cam tracks 42 and 43 such that the output of the mechanical force enhancement device 10, as observed in the rod 18, is controlled and exhibits a smooth transition between the low and high force portions of the output stroke. In addition, with the construction and arrangement of the mechanical force enhancement device 10 of both embodiments, the toggle link 20 is the only component necessary or desirable to transmit the load between the cylinder rod 16 and the rod 18 such that no additional hardware is necessary to achieve the force enhancement operation of the present invention. Consequently, the device is extremely compact and lightweight compared to devices with similar load capabilities.

Accordingly, the present invention provides a mechanical force enhancement device 10 which amplifies an input force to produce a larger output force acting upon an output member, while also reducing the speed of the output member during the latter part of the output stroke. The mechanical force enhancement device 10 employs a sequential pivoting operation which is capable of providing the above results while being uncomplicated in its design and construction. The mechanical force enhancement device 10 of the present invention is particularly well suited for use with a tool that performs work on a workpiece, such as a piercing and clinching device used to actuate a punch 64 against a die 66. Though described herein in terms of its use with a punch and die set, the mechanical force enhancement device 10 of the present invention is also suited to perform a wide variety of other operations which rely upon an output force to perform work.

While the invention has been described in terms of a preferred embodiment, it is apparent that other forms could be adopted by one skilled in the art. Accordingly, the scope of the invention is to be limited only by the following claims.

What is claimed is:

1. A mechanical force enhancer for use with a tool that performs work on a workpiece, said mechanical force enhancer comprising:
   a housing having a camming plate;
   a first and second camming contour formed in said camming plate;
   a first and second fulcrum associated with said first and second camming contours, respectively;
   linkage means operatively associated with said camming plate, said linkage means having a driven portion adjacent said first camming contour and a driving portion adjacent said second camming contour;
   a pair of spaced-apart camming means attached to said linkage means such that a first camming means of said pair of spaced-apart camming means engages said first fulcrum while a second camming means of said pair of spaced-apart camming means cams with said second camming contour, and such that said second camming means engages said second fulcrum while said first camming means cams against said first camming contour;
   means engaged with said driven portion of said linkage means for stroking said first camming means between said first fulcrum and said first camming contour; and
   an output member engaged with said driving portion of said linkage means;
   whereby said stroking means strokes said driven portion of said linkage means while said first camming means is engaged with said first fulcrum and said second camming means cams with said second camming contour to stroke said output member at a first rate and force level until said second camming means engages said second fulcrum, whereupon said first camming means disengages said first fulcrum and cams with said first camming contour so as to stroke said output member at a slower rate but higher force level than said first rate and force level.

2. The mechanical force enhancer of claim 1 further comprising:
   a second camming plate spaced apart from said camming plate;

a third and fourth camming contour formed in said second camming plate, said third and fourth camming contours having a third and fourth fulcrum, respectively; and a second pair of spaced-apart camming means attached to said linkage means such that a first camming means of said second pair of spaced-apart camming means engages said third fulcrum while a second camming means of said second pair of spaced-apart camming means cams said fourth camming contour, and such that said second camming means of said second pair of spaced-apart camming means engages said fourth fulcrum while said first camming means of said second pair of spaced-apart camming means cams against said third camming contour.

3. The mechanical force enhancer of claim 1 wherein said stroking means is a fluid driven cylinder mounted to said housing, said fluid driven cylinder having a piston rod engaged with said driven portion of said linkage means, said piston rod being capable of linear motion between a retracted position and an extended position corresponding to said first camming means engaging said first fulcrum and camming said first camming contour, respectively.

4. The mechanical force enhancer of claim 1 wherein said first and second fulcrums are a first and second detent in said first and second camming contours, respectively.

5. The mechanical force enhancer of claim 1 wherein said first and second camming contours comprise an integral U-shaped contour, said first camming contour being one leg of said integral U-shaped contour and said second camming contour being a second leg of said integral U-shaped contour.

6. The mechanical force enhancer of claim 5 wherein said first fulcrum is located at an end of said one leg of said integral U-shaped contour and said second fulcrum is located at an end of said second leg of said integral U-shaped contour.

7. The mechanical force enhancer of claim 1 wherein said linkage means is a pivot link having a driving end and a driven end, said driving end and said driven end having a driving slot and a driven slot, respectively, said stroking means being slidably engaged with said driven slot and said output member being slidably engaged with said driving slot.

8. The mechanical force enhancer of claim 1 wherein said linkage means comprises:
a pivot link having a driven end and driving end;
a driven link rotatably secured to said driven end and said stroking means; and
a driving link rotatably secured to said driving end and said output member.

9. The mechanical force enhancer of claim 1 further comprising means mounted to said housing for supporting said workpiece when impacted by said tool.

10. The mechanical force enhancer of claim 1 wherein said pair of spaced-apart camming means comprise a pair of pins mounted to said linkage means, each of said pair of pins slidably engaging a corresponding one of said first and second camming contours.

11. A mechanical force enhancer for use with a tool that performs work on a workpiece, said mechanical force enhancer comprising:
a housing;
a pair of spaced-apart camming plates attached to said housing;
a first and second camming contour formed in each of said pair of spaced-apart camming plates, each said first and second camming contours having a first and second detent, respectively;
linkage means disposed between said pair of spaced-apart camming plates, said linkage means having a driven portion adjacent each said first camming contours and a driving portion adjacent each said second camming contours;
a pair of spaced-apart camming means attached to said linkage means such that a first camming means of said pair of spaced-apart camming means engages each said first detents while a second camming means of said pair of spaced-apart camming means cams with each said second camming contours, and such that said second camming means engages each said second detents while said first camming means cams against each said first camming contours;
a fluid driven cylinder mounted to said housing, said fluid driven cylinder having a piston rod engaged with said driven portion of said linkage means, said piston rod being capable of linear motion between an extended position and a retracted position; and
a rod engaged with said driving portion of said linkage means for delivering linear motion to said tool;
whereby said fluid driven cylinder strokes said driven portion of said linkage means while said first camming means is engaged with each said first detents and said second camming means cams each said second camming contours to stroke said rod at a first rate and force level until said second camming means engages each said second detents, whereupon said first camming means disengages each said first detents and cams each said first camming contours so as to stroke said rod at a slower rate but higher force level than said first rate and force level.

12. The mechanical force enhancer of claim 11 wherein each said first and second camming contours comprise an integral U-shaped contour on each said pair of spaced-apart camming plates, each said first camming contours being one leg of each said integral U-shaped contours and each said second camming contours being a second leg of each said integral U-shaped contours.

13. The mechanical force enhancer of claim 12 wherein each said first detents is located at an end of said one leg of each said integral U-shaped contours and each said second detents is located at an end of said second leg of each said integral U-shaped contours.

14. The mechanical force enhancer of claim 11 wherein said linkage means is a pivot link, said pivot link having a driving end and a driven end, said driving end and said driven end having a driving slot and a driven slot, respectively, said piston rod being slidably engaged with said driven slot and said rod being slidably engaged with said driving slot.

15. The mechanical force enhancer of claim 11 wherein said linkage means comprises:
a pivot link having a driven end and a driving end;
a driven link rotatably secured to said driven end and said fluid driven cylinder; and
a driving link rotatably secured to said driving end and said rod.

16. The mechanical force enhancer of claim 11 further comprising adjustable stop means for limiting said linear motion of said piston rod so as to limit said linear motion of said rod.

17. The mechanical force enhancer of claim 11 further comprising means mounted to said housing for supporting said workpiece when impacted by said tool.

18. The mechanical force enhancer of claim 11 wherein said pair of spaced-apart camming means comprise a pair of pins mounted to said linkage means, each of said pair of pins slidably engaging a corresponding set of said first and second camming contours.

19. A mechanical force enhancer for use with a tool that performs work on a workpiece, said mechanical force enhancer comprising:

a housing having a support portion extending therefrom;

a pair of spaced-apart camming plates attached to said housing;

an integral U-shaped contour formed in each of said pair of spaced-apart camming plates, each said integral U-shaped contour having a first camming portion defined by one leg of said integral U-shaped contour and a second camming portion defined by a second leg of said integral U-shaped contour;

a first detent located at an end of each said one leg of said integral U-shaped contours and a second detent located at an end of each said second leg of said integral U-shaped contours;

a pivot link disposed between said pair of spaced-apart camming plates, said pivot link having a driven end adjacent each said first camming portions and a driving end adjacent each said second camming portions;

a pair of spaced-apart camming members attached to said pivot link such that a first camming member of said pair of spaced-apart camming members engages each said first detents while a second camming member of said pair of spaced-apart camming members cams with each said second camming portions, and such that said second camming member engages each said second detents while said first camming member cams against each said first camming portions;

a fluid driven cylinder mounted to said housing, said fluid driven cylinder having a piston rod engaged with said driven end of said pivot link, said piston rod being capable of linear motion between an extended position and a retracted position;

a rod engaged with said driving portion of said pivot link for delivering linear motion to said tool; and means mounted to said support portion of said housing for supporting said workpiece when impacted by said tool;

whereby said fluid driven cylinder strokes said driven end of said pivot link while said first camming means is engaged with each said first detents and said second camming ember cams each said second camming portions to stroke said rod at a first rate and force level until said second camming member engages each said second detents, whereupon said first camming member disengages each said first detents and cams each said first camming portions so as to stroke said rod at a slower rate but higher force level than said first rate and force level.

* * * * *

UNITED STATES PATENT AND TRADEMARK OFFICE
CERTIFICATE OF CORRECTION

PATENT NO. : 5,251,502
DATED : October 12, 1993
INVENTOR(S) : Ronald J. Eisbrenner, et. al.

It is certified that error appears in the above-indentified patent and that said Letters Patent is hereby corrected as shown below:

Title page, item [75], line 2, delete "Maccomb" insert --Macomb--.
item [57], Abstract, delete "amplified" insert --amplifies--.

Column 1, line 28, delete "An" insert ---- As ----.

Column 6, line 20, delete "ends" insert ---- end ----.

Column 6, line 62, delete "end" insert ---- and ----.

Column 9, line 27, delete "are" insert ---- is ----.

Column 9, line 61, delete "toggle" insert ---- pivot ----.

Column 14, line 24, delete "ember" insert ---- member ----.

Signed and Sealed this

Seventeenth Day of May, 1994

Attest:

BRUCE LEHMAN

Attesting Officer          Commissioner of Patents and Trademarks